(12) United States Patent
Li

(10) Patent No.: US 11,710,499 B2
(45) Date of Patent: Jul. 25, 2023

(54) INFORMATION-PROCESSING DEVICE, VEHICLE, COMPUTER-READABLE STORAGE MEDIUM, AND INFORMATION-PROCESSING METHOD

(71) Applicant: HONDA MOTOR CO., LTD., Tokyo (JP)

(72) Inventor: Yuanchao Li, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 103 days.

(21) Appl. No.: 17/165,947

(22) Filed: Feb. 3, 2021

(65) Prior Publication Data
US 2021/0249034 A1    Aug. 12, 2021

(30) Foreign Application Priority Data
Feb. 6, 2020   (JP) .................................. 2020-019021

(51) Int. Cl.
| | |
|---|---|
| *G10L 25/63* | (2013.01) |
| *G10L 15/16* | (2006.01) |
| *G06V 20/59* | (2022.01) |
| *G06V 10/82* | (2022.01) |
| *G06V 40/16* | (2022.01) |

(52) U.S. Cl.
CPC .............. *G10L 25/63* (2013.01); *G06V 10/82* (2022.01); *G06V 20/597* (2022.01); *G06V 40/174* (2022.01); *G10L 15/16* (2013.01)

(58) Field of Classification Search
None
See application file for complete search history.

(56) References Cited

U.S. PATENT DOCUMENTS

| | | | |
|---|---|---|---|
| 2014/0112556 A1* | 4/2014 | Kalinli-Akbacak | .... G10L 17/26 382/128 |
| 2021/0097887 A1* | 4/2021 | Lin | .......................... G10L 15/22 |

(Continued)

OTHER PUBLICATIONS

Ray, et al. "Multi-level Attention Network using Text, Audio and Video for Depression Prediction", AVEC'19, pp. 81-88, Oct. 2019 (Year: 2019).*

(Continued)

*Primary Examiner* — Pierre Louis Desir
*Assistant Examiner* — Nicole A K Schmieder

(57) ABSTRACT

An information-processing device includes a first feature-value information acquiring unit for acquiring an acoustic feature-value vector and a language feature-value vector extracted from a user's spoken voice. The information-processing device includes a second feature-value information acquiring unit for acquiring an image feature-value vector extracted from the user's facial image. The information-processing device includes an emotion estimating unit including a learned model including: a first attention layer using, as inputs, a first vector generated from the acoustic feature-value vector and a second vector generated from the image feature-value vector; and a second attention layer using, as an input, an output vector from the first attention layer and a third vector generated from the language feature-value vector, wherein the emotion estimating unit is for estimating the user's emotion based on the output vector from the second attention layer.

9 Claims, 5 Drawing Sheets

(56) References Cited

U.S. PATENT DOCUMENTS

2021/0201004 A1* 7/2021 Yadav .................... G06V 20/46
2021/0362725 A1* 11/2021 Yang ................. B60W 50/0098

OTHER PUBLICATIONS

Metallinou et al. "Tracking changes in continuous emotion states using body language and prosodic cues", 2011, ICASSP, pp. 2288-2291 (Year: 2011).*

Chiori Hori et al.,"Attention based multimodal fusion for video description", Proceedings of the IEEE international conference on computer vision, Oct. 2017, p. 4193-4202.

Haiyang Xu et al., "Learning Alignment for Multimodal Emotion Recognition from Speech", INTERSPEECH 2019, International Speech Communication Association, Sep. 2019,pp. 3569-3573.

* cited by examiner

INFORMATION-PROCESSING DEVICE, VEHICLE, COMPUTER-READABLE STORAGE MEDIUM, AND INFORMATION-PROCESSING METHOD

CROSS REFERENCE TO RELATED APPLICATION

The contents of the following Japanese patent application are incorporated herein by reference, Japanese Patent Application NO. 2020-019021 filed on Feb. 6, 2020.

BACKGROUND

1. Technical Field

The present invention relates to an information-processing device, a vehicle, a computer-readable storage medium, and an information-processing method.

2. Related Art

The Non-Patent Literature 1 describes an attention mechanism using an image feature-value, a motion feature-value, and a voice feature-value. The Non-Patent Literature 1 describes an attention mechanism using, as inputs, the image feature-value, the motion feature-value, and the voice feature-value. The Non-Patent Literature 2 describes an attention mechanism using, as inputs, the voice feature-value and a text feature-value.

PRIOR ART LITERATURE

Patent Literature

[Non-Patent Literature 1] Chiori Hori, Takaaki Hori, Teng-Yok Lee, Ziming Zhang, Bret Harsham, John R Hershey, Tim K Marks, and Kazuhiko Sumi, "Attention-based multimodal fusion for video description", Proceedings of the IEEE international conference on computer vision, October, 2017, p. 4193-4202

[Non-Patent Literature 2] Haiyang Xu, Hui Zhang, Kun Han, Yun Wang, Yiping Peng, and Xiangang Li, "Learning Alignment for Multimodal Emotion Recognition from Speech", INTERSPEECH 2019, International Speech Communication Association, September, 2019

DESCRIPTION OF EXEMPLARY EMBODIMENTS

The following describes the present invention using embodiments of the invention, but the following embodiments do not limit the invention according to the claims. Not all combinations of features described in the embodiments are necessarily required for solutions of the invention.

Figure 1:
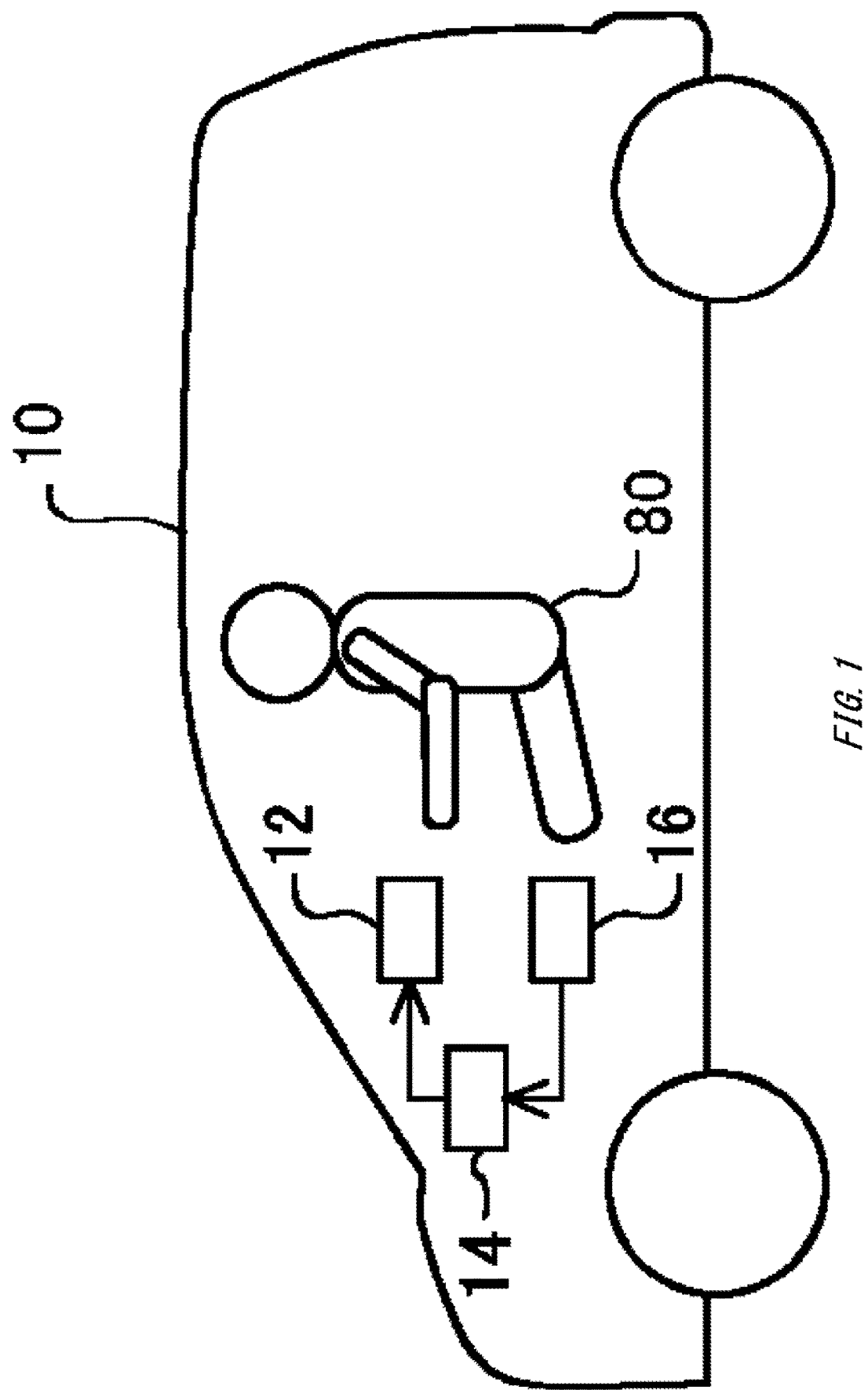
FIG. 1 schematically illustrates a configuration comprised in a vehicle 10.

FIG. 1 schematically illustrates a configuration comprised in a vehicle 10. The vehicle 10 is a transportation unit such as a motor vehicle, for example. An occupant 80 may be a driver of the vehicle 10. The occupant 80 may be a person other than the driver of the vehicle 10. The occupant 80 is an example of a user.

The vehicle 10 includes an information-processing device 14, a sensor 16, and a device 12. The device 12 is a device controlled by the information-processing device 14. The information-processing device 14 estimates emotions of the occupant 80 in the vehicle 10. The information-processing device 14 controls the device 12 based on the estimated emotions of the occupant 80. For example, the device 12 is a device to perform conversational interactions with the occupant 80 in the vehicle 10. The information-processing device 14 controls, based on the emotions of the occupant 80, rhythms and words of conversational voices when the device 12 performs the conversational interactions with the occupant 80.

The sensor 16 acquires information on the occupant 80. For example, the sensor 16 includes a microphone for capturing voices of the occupant 80 and a camera for capturing image information of the occupant 80. The information-processing device 14 estimates emotions of the occupant 80, based on the voice information and the image information of the occupant 80 acquired by the sensor 16. For example, the information-processing device 14 estimates emotions of the occupant 80 by using a learned neural-network generated with machine learning, based on an acoustic feature-value vector and a language feature-value vector extracted from the voice information of the occupant 80 acquired by the sensor 16, and an image feature-value vector extracted from an image of the facial area in the image information of the occupant 80.

For example, when the occupant 80 speaks "Good morning" within the vehicle 10, the information-processing device 14 acquires an acoustic feature-value vector and a language feature-value vector extracted from voice information acquired when the occupant 80 speaks "Good morning" and an image feature-value vector extracted from image information acquired when the occupant 80 speaks "Good morning". When acquiring an estimation result that the occupant 80 has a high emotion of "pleasure" based on the acoustic feature-value vector, the language feature-value vector, and the image feature-value vector, the information-processing device 14 generates an output text of a sentence "Good morning. It's a good day to drive!", while generating output voice data to speak the output text with an upbeat rhythm, and then causing the device 12 to replay the output text.

Figure 2:
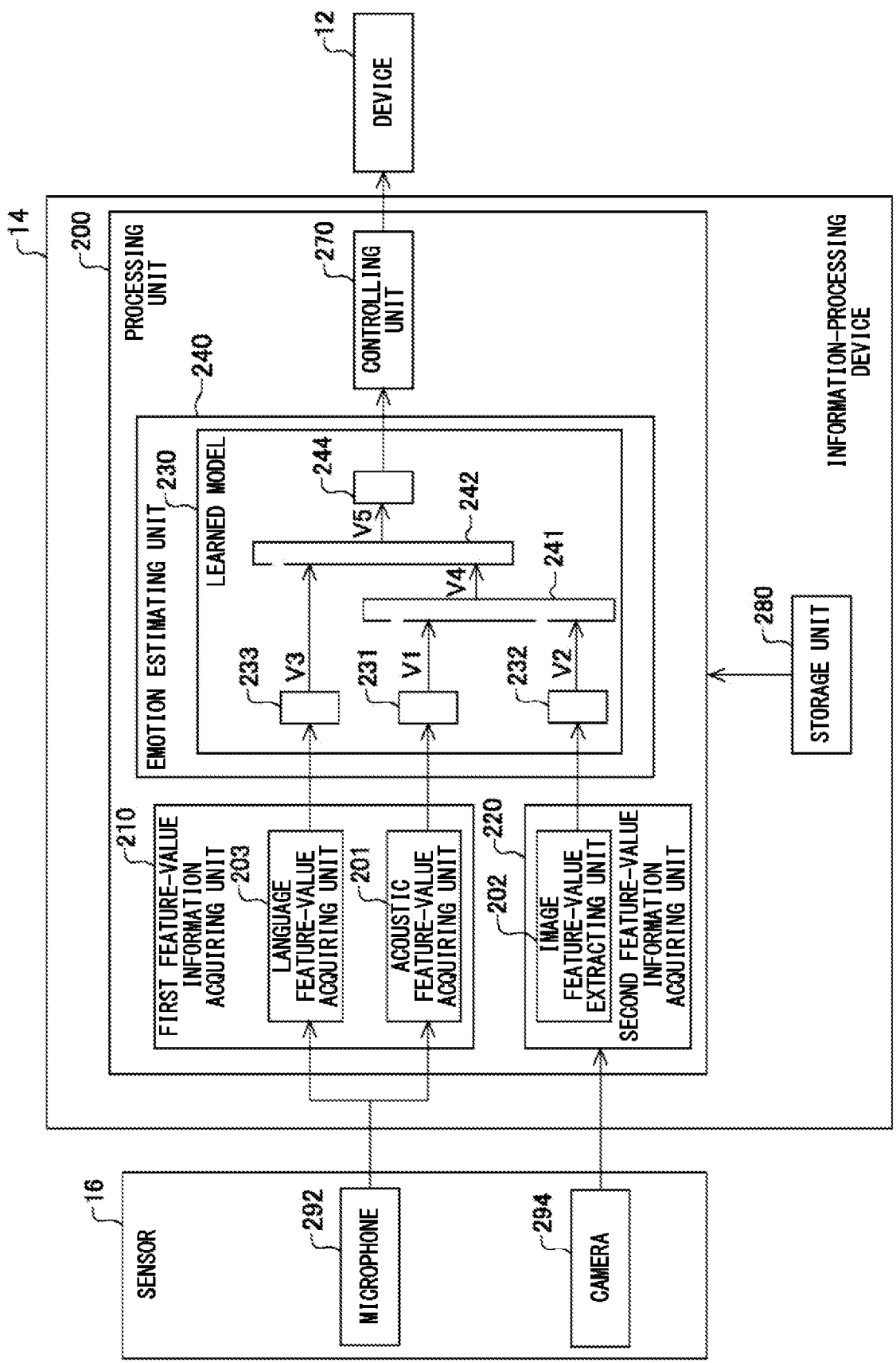
FIG. 2 illustrates a configuration of a system including an information-processing device 14, a sensor 16, and a device 12.

FIG. 2 illustrates a configuration of a system including the information-processing device 14, the sensor 16, and the device 12. The sensor 16 includes a microphone 292 and a camera 294. The microphone 292 is an example of a voice capturing unit for acquiring spoken voices of the occupant 80. The camera 294 is an example of an image capturing unit for acquiring an image of the occupant 80. The microphone 292 generates voice information based on voices the occupant 80 speaks. The camera 294 takes a picture of the occupant 80 within the vehicle 10, generating image information of the occupant 80. The occupant 80 is a person with riding on the vehicle 10. The occupant 80 may be a driver of the vehicle 10, or may be a person other than the driver of the vehicle 10.

The information-processing device 14 includes a processing unit 200 and a storage unit 280. The processing unit 200 is implemented by an arithmetic processing device including a processor, for example. The storage unit 280 is implemented with a non-volatile storage media included in it. The storage unit 280 stores learned neural-network data generated with machine learning. The processing unit 200 performs processing by using information stored in the storage unit 280.

The processing unit 200 includes a first feature-value information acquiring unit 210, a second feature-value information acquiring unit 220, an emotion estimating unit 240, and a controlling unit 270.

The first feature-value information acquiring unit 210 acquires an acoustic feature-value vector and a language feature-value vector extracted from spoken voices of the occupant 80. For example, the first feature-value information acquiring unit 210 extracts the acoustic feature-value vector and the language feature-value vector from voice information generated by the microphone 292. The acoustic feature-value vector may include at least one of a feature-value vector of sound pitch, a feature-value vector of speaking speed, and a feature-value vector of voice intensity.

In particular, the first feature-value information acquiring unit 210 includes an acoustic feature-value acquiring unit 201 and a language feature-value acquiring unit 203. The language feature-value acquiring unit 203 converts the voice information generated by the microphone 292 into text data with voice recognition. The language feature-value acquiring unit 203 generates a feature-value vector based on the text data converted from the voice information. For example, the language feature-value acquiring unit 203 may convert a word included in the text data into a vector, by using Word Embedding, which maps a word to a vector. The language feature-value acquiring unit 203 may generate the vector as a language feature-value vector.

The first feature-value information acquiring unit 210 may transmit the voice information generated by the microphone 292 to an external voice processing server, and cause the external voice processing server to perform voice recognition. The language feature-value acquiring unit 203 may generate a language feature-value vector based on text data received from the external voice processing server. When the external voice processing server has a function of extracting a language feature-value vector, the language feature-value acquiring unit 203 may acquire the language feature-value vector from the external voice processing server.

The acoustic feature-value acquiring unit 201 extracts the acoustic feature-value from the voice information generated by the microphone 292, and generates the acoustic feature-value vector by converting the extracted acoustic feature-value into a vector form. The acoustic feature-value may include rhythmical feature-value such as the basic frequency of a voice signal, the intensity of the voice signal, and the duration of each sound in the voice signal.

The first feature-value information acquiring unit 210 may transmit the voice information generated by the microphone 292 to the external voice processing server, causing the external voice processing server to extract the acoustic feature-value. The acoustic feature-value acquiring unit 201 may generate the acoustic feature-value vector based on the acoustic feature-value received from the external voice processing server.

The second feature-value information acquiring unit 220 acquires the image feature-value vector extracted from a facial image of the occupant 80. The second feature-value information acquiring unit 220 includes an image feature-value extracting unit 202. The image feature-value extracting unit 202 extracts the image feature-value from the image information acquired by the camera 294. For example, the image feature-value extracting unit 202 identifies the facial area of the occupant 80 based on the image information acquired by the camera 294, extracting the image feature-value from the image information of the identified facial area. The image feature-value extracting unit 202 generates the image feature-value vector by converting the extracted image feature-value into a vector form. The image feature-value may include a LBP (Local Binary Pattern) feature-value, a LBP-TOP feature-value, etc.

The second feature-value information acquiring unit 220 may transmit, to the external image processing server, the image information generated by the camera 294, causing the external image processing server to extract the image feature-value. The language feature-value acquiring unit 203 may generate the image feature-value vector based on the image feature-value received from the external voice processing server.

The emotion estimating unit 240 acquires the language feature-value vector and the acoustic feature-value vector acquired by the first feature-value information acquiring unit 210, and the image feature-value vector acquired by the second feature-value information acquiring unit 220. The emotion estimating unit 240 has a learned model 230 including a first BGRU layer 231, a second BGRU layer 232, a third BGRU layer 233, a first attention layer 241, a second attention layer 242, and an output layer 244. The learned model 230 may be a neural-network model acquired by machine learning using teaching data including: the acoustic feature-value vector and the language feature-value vector extracted from voice information of a person; the image feature-value vector extracted from the facial image of the person; and information indicating emotions of the person. The data of the learned model 230 is stored in the storage unit 280, and loaded into the emotion estimating unit 240 when the processing unit 200 estimates emotions.

The first attention layer 241 generates a first output vector V4 based on the acoustic feature-value vector and the image feature-value vector. In particular, the first attention layer 241 generates the first output vector V4 based on a first vector V1 generated from the acoustic feature-value vector and a second vector V2 generated from a facial feature-value vector. More particularly, the first attention layer 241 is an attention layer with both the first vector V1 generated from the acoustic feature-value vector and the second vector V2 defined as inputs, and the first output vector V4 defined as an output.

The second attention layer 242 generates a second output vector V5 based on the first output vector V4 and the language feature-value vector. In particular, the second attention layer 242 generates the second output vector V5 based on the first output vector V4 and a third vector V3 generated from the language feature-value vector. More particularly, the second attention layer 242 is an attention layer with both the first output vector V4 and the third vector V3 defined as inputs and the second output vector V5 defined as an output. Between the first attention layer 241 and the second attention layer 242 may be included an operational unit that performs any operation on the first output vector V4, thereby adopting a manner in which the second attention layer 242 inputs both the output of the operational unit and the third vector V3, etc.

The first BGRU layer 231 outputs the first vector V1 to be inputted to the first attention layer 241, with the acoustic feature-value vector defined as an input. The second BGRU layer 232 outputs the second vector V2 to be inputted to the first attention layer 241, with the image feature-value vector defined as an input. The third BGRU layer 233 outputs the third vector V3 to be inputted to the second attention layer 242, with the language feature-value vector defined as an input. The BGRU layers are bidirectional GRU (Gated Recurrent Unit) layers. The BGRU layers are a kind of GRU layer. The GRU layers are an example of recurrent neural-network layer. Instead of the BGRU layers, an LSTM (Long short-term memory) layer may be applied.

The first BGRU layer 231 is an example of a first neural-network layer. The first neural-network layer may include an operational unit that performs any operation other than operations performed by the first BGRU layer 231. The second BGRU layer 232 is an example of a second neural-network layer. The second neural-network layer may include an operational unit that performs any operation other than operations performed by the second BGRU layer 232. The third BGRU layer 233 is an example of a third neural-network layer. The third neural-network layer may include an operational unit that performs any operation other than operations performed by the third BGRU layer 233.

The output layer 244 generates information indicating emotions based on the second output vector V5 from the second attention layer 242. The output layer 244 may output information indicating each probability of predetermined types of emotions. For example, the output layer 244 may include a pooling layer, a fully connected layer, a softmax layer, or the like, outputting information indicating each probability of the predetermined types of emotions. In this manner, the emotion estimating unit 240 estimates emotions of the occupant 80 based on the second output vector V5. The emotion estimating unit 240 outputs, as information indicating emotions of the occupant 80, the output of output layer 244 to the controlling unit 270. The controlling unit 270 controls the device 12, based on emotions of the occupant 80 estimated by the emotion estimating unit 240.

The device 12 may be a voice output device that outputs voices to the occupant 80. The controlling unit 270 may generate voice data to be outputted from the device 12, based on emotions of the occupant 80 estimated by the emotion estimating unit 240. For example, the controlling unit 270 may generate voice data with rhythm depending on emotions of the occupant 80, causing the device 12 to output the data. The controlling unit 270 may generate, based on emotions of the occupant 80, text data to cause the device 12 to speak, causing the device 12 to output the data. For example, when the occupant 80 is likely to have an emotion of pleasure, the controlling unit 270 may generate voice data with a lot of high-tone components included, causing the device 12 to output the data. When the occupant 80 is likely to have an emotion of surprise, the controlling unit 270 may generate voice data with relaxing rhythm, outputting the data to the device 12. The controlling unit 270 may also cause the device 12 to output music determined based on emotions of the occupant 80. The device 12 may be an image output device for outputting an image. The controlling unit 270 may generate an image determined depending on emotions of the occupant 80, outputting the image to the device 12, for example.

The device 12 may be a device for controlling running of the vehicle 10. The controlling unit 270 may control the device 12 for controlling running of the vehicle 10, based on emotions of the occupant 80 estimated by the emotion estimating unit 240. For example, when determining that the possibility of the occupant 80 having an emotion of unrest during non-self-driving of the vehicle 10 is higher than a predetermined value, the controlling unit 270 may replay with a relaxing voice that the driving mode of the vehicle 10 will be switched from the manual driving mode to the self-driving mode, instructing the device 12 for controlling running of the vehicle 10 to switch the driving mode to the self-driving mode. The storage unit 280 may store information indicating contents of controlling the device 12, corresponding to information indicating emotions of the occupant 80. The controlling unit 270 may control, based on emotions of the occupant 80, the device 12, according to the contents of controlling stored in the storage unit 280.

When persons express their emotions, the emotions often appear as facial expressions or the like before appearing in a voice. For example, the timing when emotions appear in a face often goes approximately 100 milliseconds in advance of the timing when the emotions appear in a voice. In addition, when persons have conversations, for example, some speak negative words with a positive-emotion voice, and others speak positive words with a negative-emotion voice. In this manner, persons may speak words whose contents are opposite to their emotions.

In the emotion estimating unit 240, the first attention layer 241 first processes a set of the first vector based on the image feature-value vector and the second vector based on the acoustic feature-value vector. This can generate an output vector based on the combination of the image feature-value vector and the acoustic feature-value vector, both of which have strong association with each other. The first vector based on the image feature-value vector can also be aligned with the second vector, depending on the strength of the association with the second vector based on the acoustic feature-value vector. This can generate the output vector taking into account a time lag between timing when emotions appear in a face and timing when emotions appear in a voice. Then, the second attention layer 242 processes both the output vector of the first attention layer 241, and the third vector based on the language feature-value vector. This enables contents of words a person has spoken to be reflected in the output vector of the second attention layer 242 to a certain extent. Thus, for example, even when persons speak words with opposite contents to their emotions, it becomes likely to be able to estimate their emotions more robustly.

Figure 3:
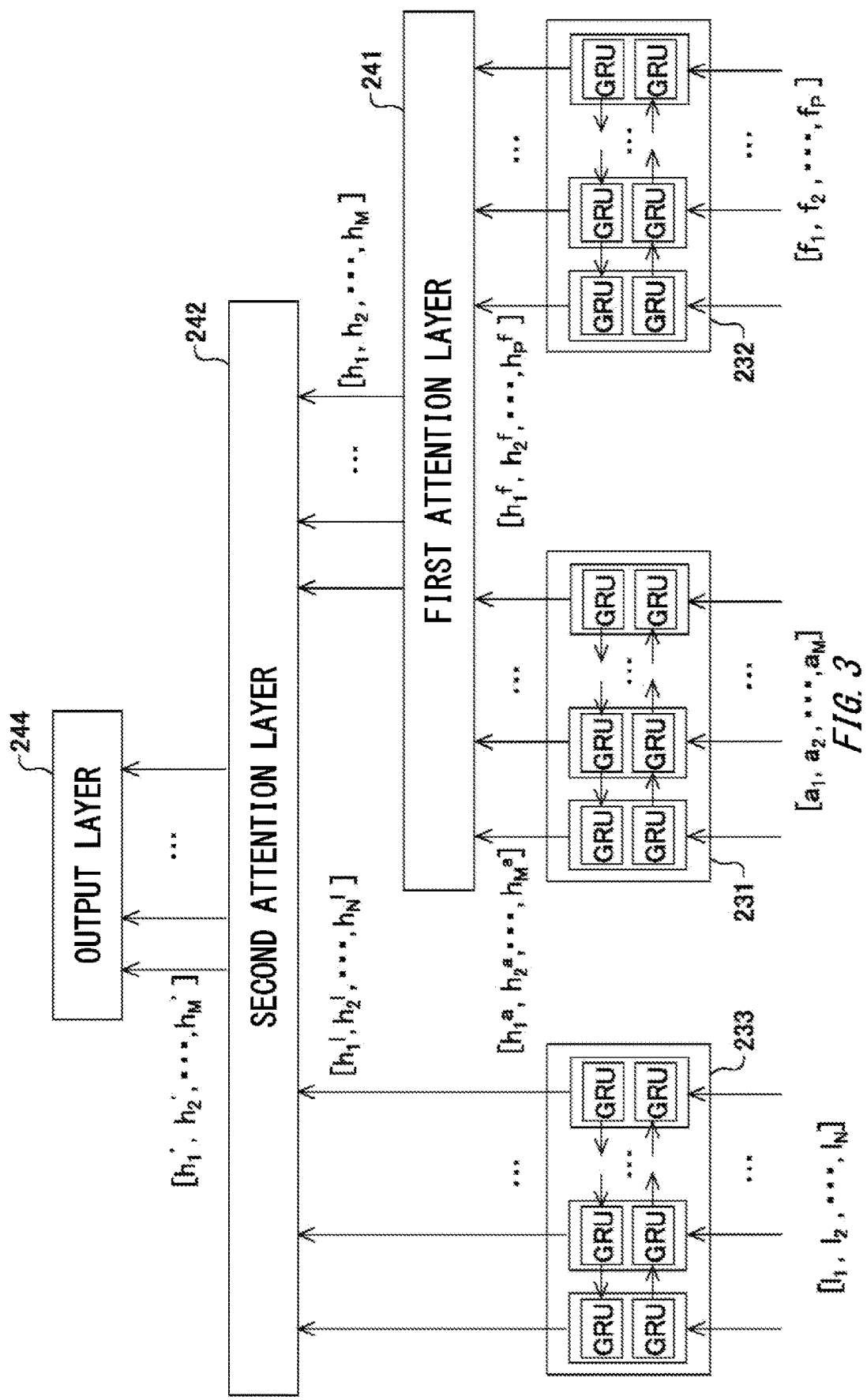
FIG. 3 schematically illustrates a configuration of a learned model 230.

FIG. 3 schematically illustrates a configuration of the learned model 230. To the first BGRU layer 231 is inputted a group of acoustic feature-value vectors, $[a_1, a_2, \ldots a_M]$. Herein, i is defined as an integer from 1 to M, and $a_i$ is the acoustic feature-value vector extracted from the i-th voice frame in a plurality of voice frames acquired by segmenting voice data with a predetermined time. M is the number of voice frames to be defined as subjects for input.

To the second BGRU layer 232 is inputted a group of image feature-value vectors, $[f_1, f_2, \ldots f_P]$. Herein, j is defined as an integer from 1 to P, and $f_j$ is the image feature-value vector extracted from the j-th image frame in a plurality of image frames included in video data information generated by the camera 294. P is the number of image frames to be defined as subjects for input.

To the third BGRU layer 233 is inputted a group of language feature-value vectors, $[l_1, l_2, \ldots l_N]$. Herein, k is defined as an integer from 1 to N, and $l_k$ is the language feature-value vector acquired by converting the k-th word in a plurality of words included in a text of spoken contents into a vector. N is the number of words to be defined as subjects for input.

The first BGRU layer 231, the second BGRU layer 232, and the third BGRU layer 233 perform operations represented by the following Expression (1), Expression (2), and Expression (3).

[Equation 1]

$$\vec{h}_t = GRU(\vec{x}_t, \vec{h}_{t-1}) \tag{1}$$

$$\overleftarrow{h}_t = GRU(\overleftarrow{x}_t, \overleftarrow{h}_{t-1}) \tag{2}$$

$$h_t = \vec{h}_t \oplus \overleftarrow{h}_t \tag{3}$$

In Expressions (1) to (3), $x_t$ denotes the feature-value vector to be inputted, at time t, to the first BGRU layer 231, the second BGRU layer 232, and the third BGRU layer 233, respectively. In particular, $x_t$ in the first BGRU layer 231 is $a_i$, $x_t$ in the second BGRU layer 232 is $f_j$, and $x_t$ in the third BGRU layer 233 is $l_k$. $h_t$ in Expressions (1) to (3) is a hidden state vector in each GRU at time t.

Each of vector directions appended to $x_t$ and $h_t$ in Expressions (1) to (3) denotes whether it is information of the forward direction GRU or information of the reverse direction GRU in each BGRU layer. The right-direction vector indicates an input vector or a hidden state vector of the forward direction GRU, and the left-direction vector indicates an input vector or a hidden state vector of the reverse direction GRU. In addition, the right-side of Expression (3) indicates to couple the hidden state vector of the forward direction GRU and the hidden state vector of the reverse direction GRU.

The first attention layer 241 performs operations represented by the following Expression (4), Expression (5), and Expression (6).

[Equation 2]

$$e_{i,j} = \omega^T \tanh(W h_i^a + U h_j^f + b) \tag{4}$$

$$\alpha_{i,j} = \frac{\exp(e_{i,j})}{\sum_{\tau=1}^{P} \exp(e_{i,\tau})} \tag{5}$$

$$h_i = \sum_{j=1}^{P} \alpha_{i,j} h_j^f \tag{6}$$

In Expressions (4) to (6), $\omega^T$, W, U, and b are parameters determined by machine learning. $h_i^a$ denotes the i-th hidden state vector outputted from the first BGRU layer 231. $h_j^f$ denotes the j-th hidden state vector outputted from the second BGRU layer 232. $e_{i,j}$ is an alignment score calculated from scoring function with components of $h_i^a$ and $h_j^f$ defined as arguments. Expression (4) applies tan h function as scoring function. $\alpha_{i,j}$ is a weighting factor of attention to $h_j^f$ relative to the i-th output vector.

The second attention layer 242 performs operations represented by the following Expression (7), Expression (8), and Expression (9).

[Equation 3]

$$e'_{i,k} = \omega'^T \tanh(W' h_i + U' h_k^l + b') \tag{7}$$

$$\alpha'_{i,k} = \frac{\exp(e'_{i,k})}{\sum_{\tau=1}^{N} \exp(e'_{i,\tau})} \tag{8}$$

$$h'_i = \sum_{k=1}^{N} \alpha'_{i,k} h_k^l \tag{9}$$

In Expressions (7) to (9), $\omega^T$, W', U', and b' are parameters determined by machine learning. $h_i$ denotes the i-th output vector in the first attention layer 241. Nil denotes the k-th hidden state vector outputted from the third BGRU layer 233. $e'_{i,k}$ is an alignment score calculated from scoring function with components of $h_i$ and $h_k^l$ defined as arguments. Expression (7) applies tan h function as scoring function. $\alpha'_{i,k}$ is a weighting factor of attention to $h_k^l$ relative to the i-th output vector.

The output layer 244 outputs information indicating each probability of predetermined types of emotions, based on a fifth output vector $h'_i$ in the second attention layer 242. The output layer 244 includes a pooling layer, a fully connected layer, a softmax layer, etc. and may include a neural-network. The output layer 244 may include a neural-network having an output unit responding to predetermined types of emotions, to become subjects for estimation.

Figure 4:
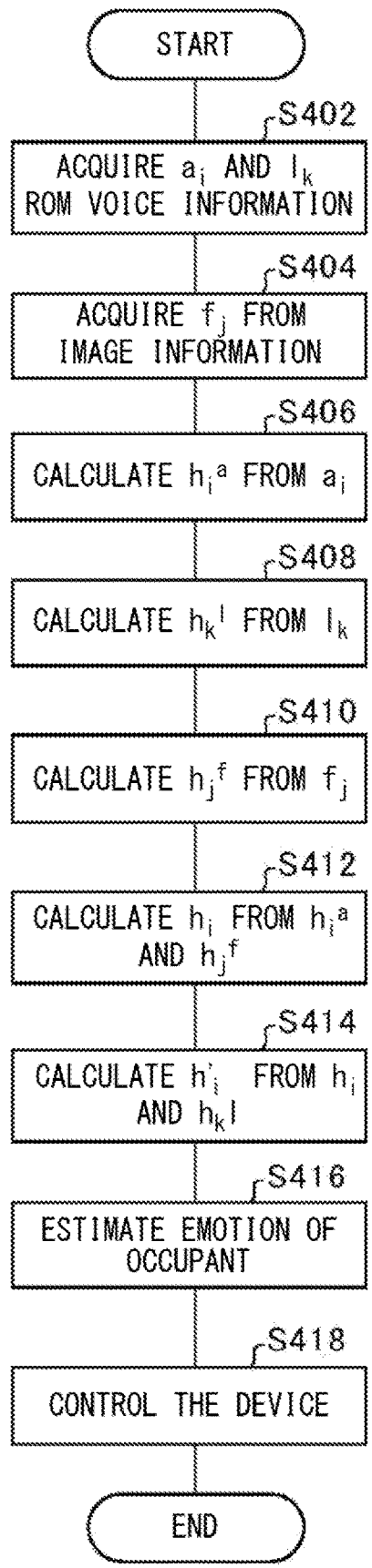
FIG. 4 illustrates a flow chart according to an information-processing method performed by the information-processing device 14.

FIG. 4 illustrates a flow chart according to an information-processing method performed by the information-processing device 14. At S402, the acoustic feature-value acquiring unit 201 acquires a group of acoustic feature-value vectors $a_i$, based on voice information outputted from the microphone 292. In addition, the language feature-value acquiring unit 203 acquires a group of language feature-value vectors $l_k$, based on the voice information outputted from the microphone 292. At S404, the image feature-value extracting unit 202 acquires a group of image feature-value vectors $f_j$ from image information outputted from the camera 294. The processes at S402 and S404 may be performed in parallel.

At S406, the first BGRU layer 231 calculates a group of first vectors $h_i^a$ from the group of acoustic feature-value vectors $a_i$. At S408, the third BGRU layer 233 calculates a group of third vectors $h_k^i$ from the group of acoustic feature-value vectors $a_i$. At S410, the second BGRU layer 232 calculates a group of second vectors $h_j^f$ from the group of image feature-value vectors $f_j$.

At S412, the first attention layer 241 calculates a group of output vectors $h_i$ from the group of first vectors $h_i^a$ and the group of second vectors $h_j^f$. At S414, the second attention layer 242 calculates a group of output vectors $h_i$ from the group of output vectors $h_i$ and the group of third vectors $h_k^l$.

At S416, the emotion estimating unit 240 estimates emotions of the occupant 80 based on the group of output vectors $h'_i$. For example, the output layer 244 may generate output values corresponding to predetermined types of emotions with the group of output vectors $h'_i$ defined as inputs. For example, the output layer 244 may generate, as an output value, information indicating each probability of a plurality of types of emotions. The emotion estimating unit 240 may estimate, as an emotion of the occupant 80, a type of emotion with the highest probability. The emotion estimating unit 240 may estimate, as an emotion of the occupant 80, a plurality of types of emotions whose probabilities are higher than a predetermined value. At S418, the controlling unit 270 controls the device 12, based on emotions of the occupant 80 estimated by the emotion estimating unit 240. For example, the controlling unit 270 generates voice data for conversational interactions with the occupant 80, causing the device 12 as a voice output device to replay the data.

The processing unit 200 repeatedly performs processes shown in S402 to S418 in order, by using voice information and image information sequentially outputted from the sensor 16.

As described above, according to the information-processing device 14, the first attention layer 241 processes a set of the first vector based on the image feature-value vector and the second vector based on the acoustic feature-value vector, and the second attention layer 242 processes the output vector of the first attention layer 241 and the third vector based on the language feature-value vector. This can estimate emotions of the occupant 80 more appropriately.

The vehicle 10 is an example of a transportation unit. The transportation unit includes trains, ships, aircrafts, and the like, in addition to motor vehicles such as passenger vehicles and buses. The transportation unit is an example of a mobile unit.

Figure 5:
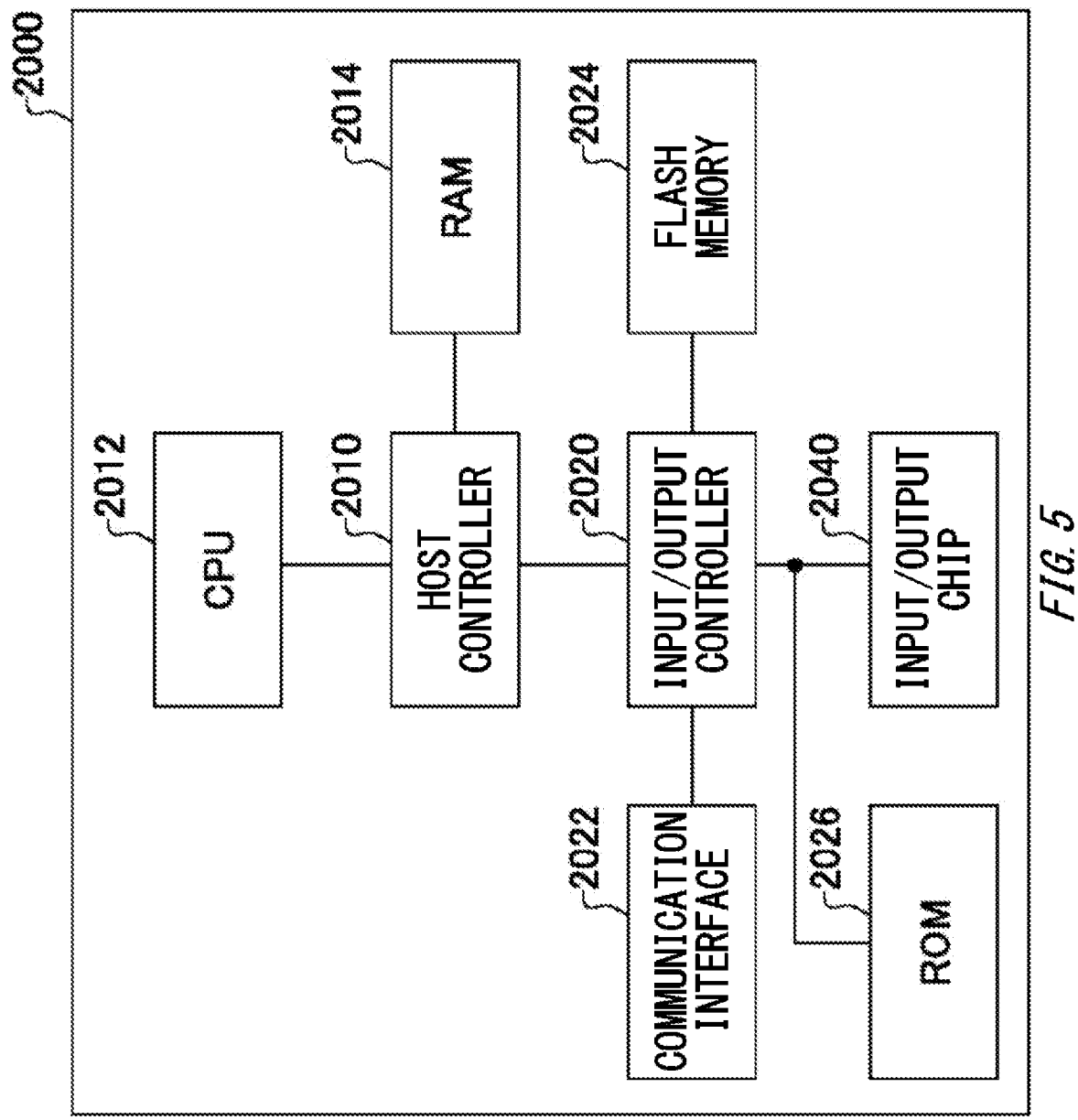
FIG. 5 illustrates an example of a computer 2000.

FIG. 5 illustrates an example of a computer 2000 in which a plurality of embodiments of the present invention can be embodied entirely or partially. A program installed into the computer 2000 can cause the computer 2000 to: function as a device such as the information-processing device 14 according to the embodiments or each part of the device; perform operations associated with the device or each part of the device; and/or perform processes according to the embodiments or steps of the processes. Such a program may be executed by a CPU 2012, in order to cause the computer 2000 to perform specific operations associated with some or all of blocks in processing procedures and block diagrams described in the specification.

The computer 2000 according to this embodiment includes the CPU 2012 and a RAM 2014, which are interconnected by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program and the like executed by the computer 2000 during activation, and/or a program depending on hardware of the computer 2000. The input/output chip 2040 may also connect, to the input/output controller 2020, a variety of input/output units such as a keyboard, a mouse, and a monitor, via input/output ports such as a serial port, a parallel port, a keyboard port, a mouse port, a monitor port, a USB port, and an HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014 or the ROM 2026, and executed by the CPU 2012. Information-processing described in these programs is read by the computer 2000, thereby resulting in cooperation between the program and above-described various types of hardware resources. A device or method may be constituted by implementing the operations or processes on information according to the use of the computer 2000.

For example, when communications are performed between the computer 2000 and external devices, the CPU 2012 may execute a communication program loaded in the RAM 2014, and instruct the communication interface 2022 to process communications on based on processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

In addition, the CPU 2012 may cause all or required portions of a file or a database stored in the recording medium such as the flash memory 2024 to be read by the RAM 2014, and may perform various types of processes on the data on the RAM 2014. Then, the CPU 2012 writes back the processed data into the recording medium.

Various types of information such as various types of programs, data, tables, and databases may be stored in the recording medium, and information-processing may be performed on such information. The CPU 2012 may perform, on the data read from the RAM 2014, various types of processes including various types of operations, information-processing, conditional judgments, conditional branching, unconditional branching, information searching/replacing and the like described in the specification and specified by an instruction sequence of the program, and writes back the result into the RAM 2014. In addition, the CPU 2012 may search for information in a file, a database, etc., in the recording medium. For example, when a plurality of entries each having an attribute value of a first attribute associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, thereby obtaining the attribute value of the second attribute associated with the first attribute meeting a predetermined condition.

The program or software module described above may be stored on the computer 2000 or in a computer-readable medium near the computer 2000. A recording medium such as a hard disk or a RAM provided in a server system connected to a dedicated communication network or the Internet is available as a computer-readable medium. The program stored in the computer-readable medium may be provided to the computer 2000 via the network.

The program that is installed in the computer 2000 and causes the computer 2000 to function as the information-processing device 14 may work upon the CPU 2012 and the like, causing the computer 2000 to individually function as each part of the information-processing device 14, respectively. Information-processing written in these programs functions, by being read into the computer 2000, as each part of the information-processing device 14, which is a specific means tin which software and above-described various types of hardware resources cooperate with each other. With these specific means, by implementing operations or processing of information corresponding to the intended use of the computer 2000 in this embodiment, a specific information-processing device 14 corresponding to the intended use is constructed.

A variety of embodiments have been described with reference to the block diagram and the like. In the block diagram, each block may represent (1) a step of a process in which an operation is performed, or (2) each part of a device having a role of performing the operation. Specific steps and each part may be implemented by a dedicated circuit, a programmable circuit provided along with a computer-readable instruction stored on a computer-readable medium, and/or a processor provided along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation; and a memory element such as a flip-flop, a register, a field programmable gate array (FPGA), a programmable logic array (PLA); and so on.

The computer-readable medium may include any tangible device capable of storing an instruction executed by an appropriate device, so that the computer-readable medium having the instruction stored thereon constitutes at least a part of a product including the instruction that may be executed in order to result in a means for executing an operation specified by a processing procedure or a block diagram. Examples of the computer-readable medium may include an electronic storage medium, a magnetic storage medium, an optical storage medium, an electromagnetic storage medium, a semiconductor storage medium, etc. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

The computer-readable instruction may include any of an assembler instruction, an instruction-set-architecture (ISA) instruction, a machine instruction, a machine dependent instruction, a microcode, a firmware instruction, state-setting data, or a source code or an object code written in any combination of one or more programming languages, including an object oriented programming language such as Smalltalk (registered trademark), Java (registered trademark), C++, and a conventional procedural programming language such as the "C" programming language or similar programming languages.

The computer-readable instruction may be provided to a general-purpose computer, a special-purpose computer, or a processor or a programmable circuit of other programmable data processing device, locally or via a local area network (LAN), a wide area network (WAN) such as the internet, and the computer-readable instruction may be executed in order to result in a means for executing operations specified by the described processing procedure or block diagram. Examples of the processor include a computer processor, a processing unit, a microprocessor, a digital signal processor, a controller, a microcontroller, etc.

While the embodiments of the present invention have been described, the technical scope of the invention is not limited to the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the process flow is described using phrases such as "first" or "next" in the claims, specification, or diagrams, it does not necessarily mean that the process must be performed in this order.

EXPLANATION OF REFERENCES

10: vehicle, 12: device, 14: information-processing device, 16: sensor, 80: occupant, 200: processing unit, 201: acoustic feature-value acquiring unit, 202: image feature-value extracting unit, 203: language feature-value acquiring unit, 210: first feature-value information acquiring unit, 220: second feature-value information acquiring unit, 230: model, 231: first BGRU layer, 232: second BGRU layer, 233: third BGRU layer, 240: emotion estimating unit, 241: first attention layer, 242: second attention layer, 244: output layer, 270: controlling unit, 280: storage unit, 292: microphone, 294: camera, 2000: computer, 2010: host controller, 2012: CPU, 2014: RAM, 2020: input/output controller, 2022: communication interface, 2024: flash memory, 2026: ROM, 2040: input/output chip

What is claimed is:

1. An information-processing device comprising:
a processor configured to:
acquire an acoustic feature-value vector and a language feature-value vector, extracted from a voice spoken by a user; and
acquire an image feature-value vector extracted from a facial image of the user immediately before the user has spoken; and
a memory configured to store a learned model including:
a first attention layer for generating a first output vector based on the acoustic feature-value vector and the image feature-value vector; and
a second attention layer for generating a second output vector based on the first output vector and the language feature-value vector;
wherein the processor is further configured to estimate the user's emotion based on the second output vector, and the learned model is a neural-network model acquired by machine learning using teaching data including:
an acoustic feature-value vector and a language feature-value vector extracted from the user's spoken voice;
an image feature-value vector extracted from the user's facial image; and
information indicating the user's emotion; and
wherein the processor is configured to acquire the image feature-value vector from the facial image of the user a timing of which goes approximately 100 milliseconds in advance of a timing of the voice spoken by the user.

2. The information-processing device according to claim 1, wherein the acoustic feature-value vector includes at least one of a feature-value vector of sound pitch, a feature-value vector of speaking speed, a feature-value vector of voice intensity.

3. The information-processing device according to claim 1, wherein the learned model includes:

a first neural-network layer having a first recurrent-neural-network layer, for outputting a first vector with the acoustic feature-value vector defined as an input;

a second neural-network layer having a second recurrent-neural-network layer, for outputting a second vector with the image feature-value vector defined as an input; and a third neural-network layer having a third recurrent-neural-network layer, for outputting a third vector with the language feature-value vector defined as an input, wherein the first attention layer is for outputting the first output vector based on the first vector and the second vector, and the second attention layer is for outputting the second output vector based on the first output vector and the third vector.

4. The information-processing device according to claim 3, wherein the first recurrent-neural-network layer, the second recurrent-neural-network layer, and the third recurrent-neural-network layer are GRU (Gated Recurrent Unit) layers or LSTM (Long short-term memory) layers.

5. The information-processing device according to claim 1, wherein the processor is further configured to:
acquire the voice spoken by the user;
acquire an image of the user;
control a device based on the user's emotion estimated by processor.

6. The information-processing device according to claim 5, wherein
the device is a voice output device for outputting a voice to the user, wherein
the processor is further configured to generate voice data to be outputted from the voice output device, based on the user's emotion estimated by the processor.

7. A vehicle comprising the information-processing device according to claim 1.

8. A non-transitory computer-readable storage medium having stored thereon a program that, when executed by a computer, causes the computer to perform operations comprising:
acquiring an acoustic feature-value vector and a language feature-value vector extracted from a voice spoken by a user;
acquiring an image feature-value vector extracted from a facial image of the user immediately before the user has spoken;
storing, in a memory of the computer, a learned model including:
a first attention layer for generating a first output vector based on the acoustic feature-value vector and the image feature-value vector; and
a second attention layer for generating a second output vector based on the first output vector and the language feature-value vector; and
estimating the user's emotion based on the second output vector, wherein the learned model is a neural-network model acquired by machine learning using teaching data including:
an acoustic feature-value vector and a language feature-value vector extracted from the user's spoken voice;
an image feature-value vector extracted from the user's facial image; and
information indicating the user's emotion; and
wherein the acquiring an image feature-value vector includes:
acquiring the image feature-value vector from the facial image of the user a timing of which goes approximately 100 milliseconds in advance of a timing of the voice spoken by the user.

9. An information-processing method comprising:
acquiring an acoustic feature-value vector and a language feature-value vector extracted from a voice spoken by a user;
acquiring an image feature-value vector extracted from a facial image of the user immediately before the user has spoken;
storing a learned model including:
a first attention layer for generating a first output vector based on the acoustic feature-value vector and the image feature-value vector; and
a second attention layer for generating a second output vector based on the first output vector and the language feature-value vector; and
estimating the user's emotion based on the second output vector, wherein the learned model is a neural-network model acquired by machine learning using teaching data including:
an acoustic feature-value vector and a language feature-value vector extracted from the user's spoken voice;
an image feature-value vector extracted from the user's facial image; and
information indicating the user's emotion; and
wherein the acquiring an image feature-value vector includes:
acquiring the image feature-value vector from the facial image of the user a timing of which goes approximately 100 milliseconds in advance of a timing of the voice spoken by the user.

* * * * *